US010274350B2

(12) United States Patent
Mudireddy et al.

(10) Patent No.: US 10,274,350 B2
(45) Date of Patent: Apr. 30, 2019

(54) MOBILE DEVICE AND METHOD FOR METER CONFIGURING AND DATA COLLECTION

(71) Applicant: Honeywell International Inc., Morristown, NJ (US)

(72) Inventors: Chandrasekar Reddy Mudireddy, Andhra Pradesh (IN); Suresh Kumar Palle, Karnataka (IN); Jaganmohan Y. Reddy, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 591 days.

(21) Appl. No.: 14/677,703

(22) Filed: Apr. 2, 2015

(65) Prior Publication Data

US 2016/0290838 A1    Oct. 6, 2016

(51) Int. Cl.
| | |
|---|---|
| *G01F 1/00* | (2006.01) |
| *H04W 4/80* | (2018.01) |
| *H04L 9/32* | (2006.01) |
| *H04L 29/06* | (2006.01) |
| *H04W 12/06* | (2009.01) |
| *H04W 4/12* | (2009.01) |
| *G01F 15/06* | (2006.01) |

(52) U.S. Cl.
CPC .............. *G01F 1/00* (2013.01); *G01F 15/063* (2013.01); *H04L 9/3226* (2013.01); *H04L 63/0492* (2013.01); *H04L 63/083* (2013.01); *H04W 4/12* (2013.01); *H04W 4/80* (2018.02); *H04W 12/06* (2013.01)

(58) Field of Classification Search
CPC ... H04W 4/008; H04W 84/042; H04W 12/06; H04W 4/12; G05B 2219/25428; G05B 19/042; G05B 19/4183; G05B 2219/23161; G05B 2219/23406; G05B 2219/31472; G06Q 10/06; G06Q 10/10; G06Q 50/06
See application file for complete search history.

(56) References Cited

U.S. PATENT DOCUMENTS

| | | |
|---|---|---|
| 8,180,336 B2 | 5/2012 | Wesby |
| 8,554,136 B2 | 10/2013 | McCormack |
| 2006/0272830 A1 | 12/2006 | Fima |

(Continued)

*Primary Examiner* — Robert G Bachner
(74) *Attorney, Agent, or Firm* — Jetter & Associates, P.A.; Neil R. Jetter (57) ABSTRACT

A mobile device includes a transceiver coupled to an antenna configured to send wireless signals to and receive wireless signals from a fluid meter that is battery powered that has stored security information. The mobile device includes a processor coupled to the transceiver, a mobile display and a memory device. The memory device stores a fluid meter configuration and data collection (FMCDC) program that is implemented by the processor. The mobile device wirelessly transmits a connection request to the fluid meter. The fluid meter determines whether the connection request satisfies the stored security information. Provided the connection request satisfies the stored security information, the fluid meter transmits a wireless validation signal. Responsive to receiving the wireless validation signal at the mobile device, the mobile device wirelessly writes at least one parameter on the fluid meter or wirelessly reads stored meter data from the fluid meter.

18 Claims, 7 Drawing Sheets

(56) References Cited

U.S. PATENT DOCUMENTS

| | | | |
|---|---|---|---|
| 2009/0035121 A1 | 2/2009 | Watson et al. | |
| 2009/0221240 A1* | 9/2009 | Zhang | G06K 7/0008 |
| | | | 455/68 |
| 2009/0224937 A1 | 9/2009 | Gillette et al. | |
| 2011/0004764 A1* | 1/2011 | Stuber | G01D 4/004 |
| | | | 713/176 |
| 2011/0066297 A1 | 3/2011 | Saberi et al. | |
| 2013/0290234 A1* | 10/2013 | Harris | G06N 5/022 |
| | | | 706/46 |
| 2015/0009043 A1* | 1/2015 | Quinlan | H04L 67/12 |
| | | | 340/870.3 |

* cited by examiner

MOBILE DEVICE AND METHOD FOR METER CONFIGURING AND DATA COLLECTION

FIELD

Disclosed embodiments relate to fluid meters and metering equipment for measuring fluid parameters. More specifically, disclosed embodiments relate to a mobile device and method for fluid meter configuring and data collection from the meter.

BACKGROUND

Fluid meters include sensors used for measuring various gas and liquid values such as volume used, flow rates, temperatures and pressures. Some fluid meters are used to measure consumed volumes of supplied gasses such as natural gas and propane. Other meters are used for measuring flow rates of water or sewage.

Collecting data sensed by fluid meters is conventionally costly in that each meter has to be accessed by service personnel to collect the meter readings and other data. Various techniques for remotely collecting data are known. Unfortunately, a large percentage of fluid meters are powered by batteries that have a limited power life. In general, the battery operated meter's communication interfaces are active only after a physical wired connection or during scheduled time slots to conserve the battery power. After the battery has been depleted, the meter data generally can no longer be wirelessly accessed (until the battery is replaced) and a direct physical connection must be used.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include a method for remote fluid meter configuring and data collection. The method includes providing a mobile device including a mobile display and a transceiver coupled to an antenna configured for sending wireless signals to and receiving wireless signals from an in-service fluid meter that is exclusively battery powered having a fluid flow sensor and stored security information. The mobile device further includes a memory device and at least one processor coupled to the transceiver and the memory device. The memory device stores a fluid meter configuration and data collection (FMCDC) program implemented by the processor. The mobile device wirelessly transmits a connection request to the fluid meter. The fluid meter determines whether the connection request satisfies the stored security information. Provided the connection request satisfies the stored security information, the fluid meter transmits a wireless validation signal. Responsive to receiving the wireless validation signal at the mobile device, the mobile device wirelessly writes at least one parameter on the fluid meter or wirelessly reads stored meter data from the fluid meter.

Disclosed embodiments provide a mobile device that includes a transceiver coupled to an antenna configured to send wireless signals to and receive wireless signals from a fluid meter that is exclusively battery powered having a fluid flow sensor and stored security information. The mobile device further includes a mobile display and a memory device. A processor is coupled to the transceiver, the mobile display and the memory device. The memory device stores a FMCDC program that is implemented by the processor. The mobile device wirelessly transmits a connection request to the fluid meter. The fluid meter determines whether the connection request satisfies the stored security information. Provided the connection request satisfies the stored security information, the fluid meter transmits a wireless validation signal. Responsive to receiving the wireless validation signal at the mobile device, the mobile device wirelessly writes at least one parameter on the fluid meter or wireless reads stored meter data from the fluid meter.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 1:
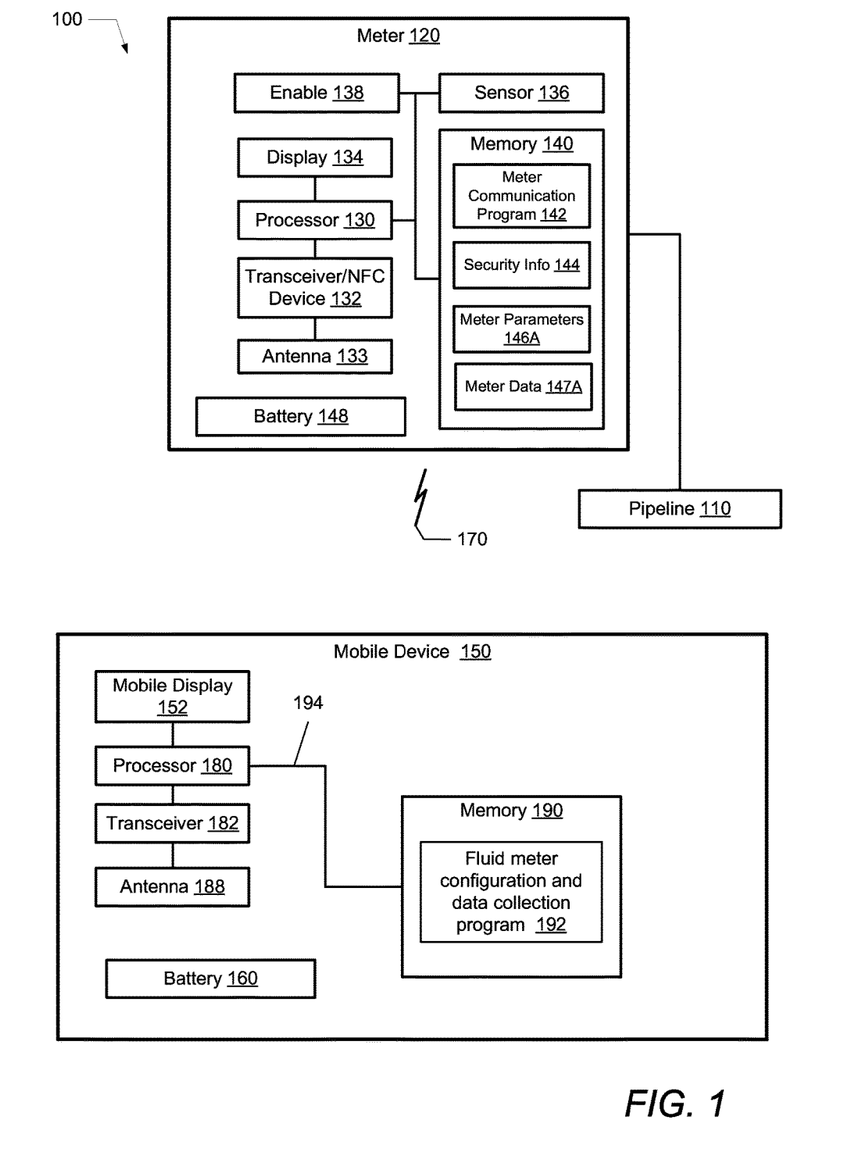
FIG. 1 is a block diagram illustrates an example fluid meter configuration and data collection system including an example mobile device and a fluid meter coupled to a pipeline, according to an example embodiment.

FIG. 1 illustrates a block diagram illustration of an example fluid meter configuration and data collection system (system) 100 including an example mobile device 150 and a fluid meter 120 coupled to a pipeline 110, according to an example embodiment. System 100 comprises one or more of the fluid meter (meter) 120, and a mobile device 150 that communicates with the meter 120 using wireless signals 170. Meter 120 can measure parameters such as the usage of a fluid or gas, for example by being interposed using flanges within the pipeline 110.

Meter 120 has a memory 140 for storing measured parameters. Meter 120 includes one or more sensors 136 such as an ultrasonic fluid flow sensor. For example, sensor 136 can measure temperature, pressure, volume and flow rates of a fluid in the pipeline 110. Meter 120 can measure parameters of various gasses such as natural gas, butane or propane. In other embodiments, sensor 136 can measure parameters of other fluids such as water or sewage.

Meter 120 includes a computing device such as a processor 130 (e.g., digital signal processor (DSP), microprocessor or microcontroller unit (MCU)) having an associated memory 140 that stores a meter communication program 142, security information 144, meter parameters 146A and meter data 147A. The meter 120 can be an off-the shelf smart meter that generally does not need any customization to support generic communication protocols such as using MODBUS protocol (established a master-slave/client-server communication between intelligent devices) or proprietary communication protocols, so that meter communication program 142 can be generic and/or include custom programming.

Processor 130 is also coupled to a transceiver/near field communication (NFC) device 132 (which as used herein can include a separate transmitter and receiver). Transceiver/NFC device 132 is connected to antenna 133. Transceiver/NFC device 132 can transmit and receive wireless signals 170 via antenna 133. Meter 120 can implement a wide variety of communication protocols such as radio frequency (RF) NFC, RFID, BLUETOOTH®, short-range 802.11, Wi-Fi, Zigbee, infrared and high frequency focused beams such as 60 GHz. In other embodiments, as noted above, the meter 120 can implement communication protocols such as MODBUS or can use a proprietary communication protocol.

As known in communications, Bluetooth is a wireless technology standard for exchanging data over short distances (using short-wavelength UHF radio waves in the ISM band from 2.4 to 2.485 GHz) Bluetooth Low Energy (BLE), sometimes referred to as "Bluetooth Smart", is a lightweight subset of classic Bluetooth and was introduced as part of the Bluetooth 4.0 core specification. Because a Bluetooth low energy device is in sleep mode most of the time and only wakes up when a connection is initiated, the power consumption can be kept to a minimum. Power consumption is kept low because the actual connection times are of only a few milliseconds (mS). The maximum, or peak, power consumption is only 15 milliamps (mA), and the average power consumption is of only about 1 microamp (uA).

Moreover, as known in communications Wi-Fi is a local area wireless technology that allows an electronic device to participate in computer networking using 2.4 GHz UHF and 5 GHz SHF ISM radio bands. Infrared (IR) wireless technology uses light instead of radio for its connectivity. Infrared is low-frequency, invisible light that can serve as a carrier of high-speed digital data. The primary wavelength range is generally 850 to 940 μm. The transmitter is an IR LED, and the receiver is a diode photodetector and amplifier. The light wave is usually modulated with a high-frequency signal that is, in turn, coded and modulated by the digital data to be transmitted.

In operation, the mobile device 150 wirelessly transmits a connection request to the meter 120, and the meter 120 determines whether the connection request satisfies security information 144 it stores in the memory 140. Provided the connection request satisfies the stored security information, the meter 120 transmits a wireless validation signal, and responsive to receiving the wireless validation signal at the mobile device 150, the mobile device wirelessly writes at least one parameter on the meter 120 or wirelessly reads stored meter data from the meter 120.

Processor 130 is also coupled to a meter display 134. Meter display 134 can be a wide variety of displays including video displays, mechanical displays, mechanical gauges, electro-luminescent displays, light emitting diodes (LED) and visual alarms or alerts. Processor 130 is further coupled to an enable control 138. Enable control 138 can be a wide variety of controls including user input devices such as buttons, rotary switches, touch pads or touch sensitive screens.

Meter 120 is shown powered exclusively by a battery 148. In order to extend the life of battery 148, various components of meter 120 can be put into a sleep mode to minimize power consumption. For example, transceiver/NFC device 132 can be put into a sleep mode when not communicating with mobile device 150. Processor 130 can perform any one or more of the methods, processes, operations, applications, or methodologies described herein. For example, processor 130 can implement the meter communication program 142 and transmit via transceiver/NFC device 132 wireless signals 170 to mobile device 150.

Mobile device 150 can be used to wirelessly write meter parameters 146A to meter 120 or to wirelessly read stored meter data 147A from meter 120. Mobile device 150 includes a processor 180 (e.g., DSP, microprocessor or MCU) having an associated memory 190 that stores a fluid meter configuration and data collection (FMCDC) program 192. Processor 180 is also coupled to a transceiver/NFC device 182, which as used herein can include a separate transmitter and receiver. Transceiver/NFC device 182 is connected to antenna 188. Processor 180 is coupled to mobile display 152. In one embodiment the mobile display 152 includes a touch sensitive screen. Processor 180 can perform any one or more of the meter configuring and data collection operations, applications, or methodologies described herein. Processor 180 can implement FMCDC program 192.

In one embodiment the wireless connection request sent by the mobile device 150 includes identification information, such identification bits, transmission during certain time intervals, or other information such as a mobile number or hardware address enabling device identity to be determined for checking by the meter 120 to a list of authorized ones of the mobile devices 150 that can access the meter 120. The meter 120 checks the security information, and if the security information received satisfies the stored security information 144, the meter 120 transmits a wireless validation signal, and responsive to receiving the wireless validation signal at the mobile device 150 the mobile device wirelessly writes at least one parameter on the meter 120 or wirelessly reads stored meter data from the meter 120.

In one embodiment the wireless signals 170 used in system 100 can be encrypted. For example, the operation of a cipher as known in encryption depends auxiliary information, commonly referred to as a "key". The encrypting procedure is varied depending on the key, which changes the detailed operation of the encrypting algorithm. A key is generally selected before using a cipher to encrypt a message. Without knowledge of the key, it is generally impossible to decrypt the resulting ciphertext into readable plaintext. In this embodiment, the mobile device 150 and the meter 120 can both have the key, with the key stored as security information 144 in memory 140 of the meter 120. The security information can also comprise a password.

Mobile device 150 is a lightweight, portable, handheld, self-powered unit that can be readily transported by a user. In one embodiment, mobile device 150 can be a laptop computer, a tablet computer, a notebook computer or a smart phone. Battery 160 can supply power to mobile device 150. In one embodiment, mobile device 150 can be powered via a utility power source (mains powered). Mobile device 150 includes a mobile display 152. In one embodiment mobile display 152 is a touch sensitive screen.

The FMCDC program 192 can also enable the mobile device 150 to provide other valued added functionality, such as locating meters in the field by near-field by auto discovery. In one embodiment, mobile device 150 can store meter locations and can be equipped with a location finding device such as global positioning system (GPS) that accurately calculates geographical location by receiving information from GPS satellites. When the mobile device 150 location is within communication range of the meter 120 location, transceiver/NFC device 182 can transmit a discovery signal to discover those meters 120 that are in the vicinity of mobile device 150.

The FMCDC program 192 can also provide the meter with a software upgrade over the air. In an embodiment, FMCDC program 192 and mobile device 150 can determine the meter type and check if any software updates are available for the meter 120. Mobile device 150 can check for software updates using another wireless communication interface such as a mobile telephone network or Wi-Fi network supporting over the air (OTA) communications. OTA can be any wireless communication method. If a software update is available for the meter 120, the mobile device 150 can wirelessly receive the meter update software using OTA. Mobile device 150 then transmits the meter update software to meter 120 via transceiver/NFC device 182.

Figure 2:
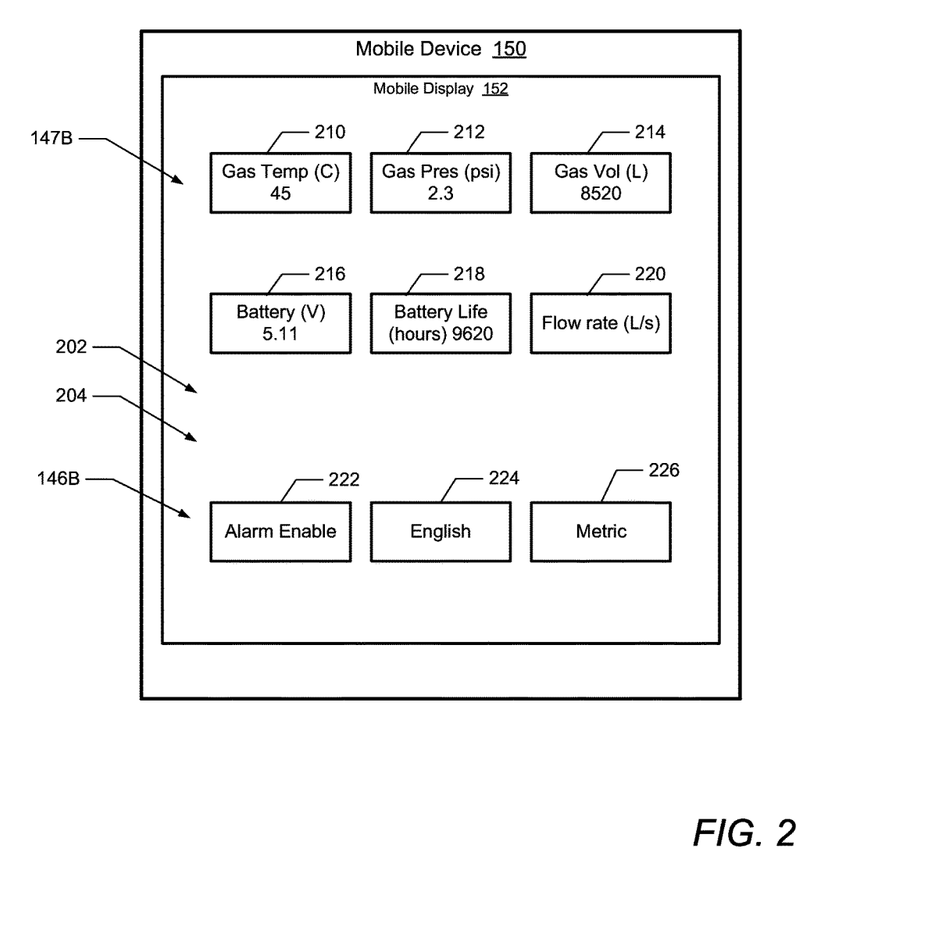
FIG. 2 is a front view of a mobile device display, according to an example embodiment.

FIG. 2 illustrates further details of mobile device 150. Mobile device 150 can be used to display meter parameters 146B to be transmitted meter 120 or to display meter data 147B received from meter 120. Mobile display 152 can display a display window 202 including graphical user interface (GUI) data 204. Meter parameters 146B can include various settings for meter 120 such as alarm enable 222 and unit settings such as English 224 and Metric 226. Meter data 147B can include various measured or sensed values from meter 120 such as gas temperature 210, gas pressure 212, gas volume 214, battery voltage 216, battery life 218 and flow rate 220.

Figure 3:
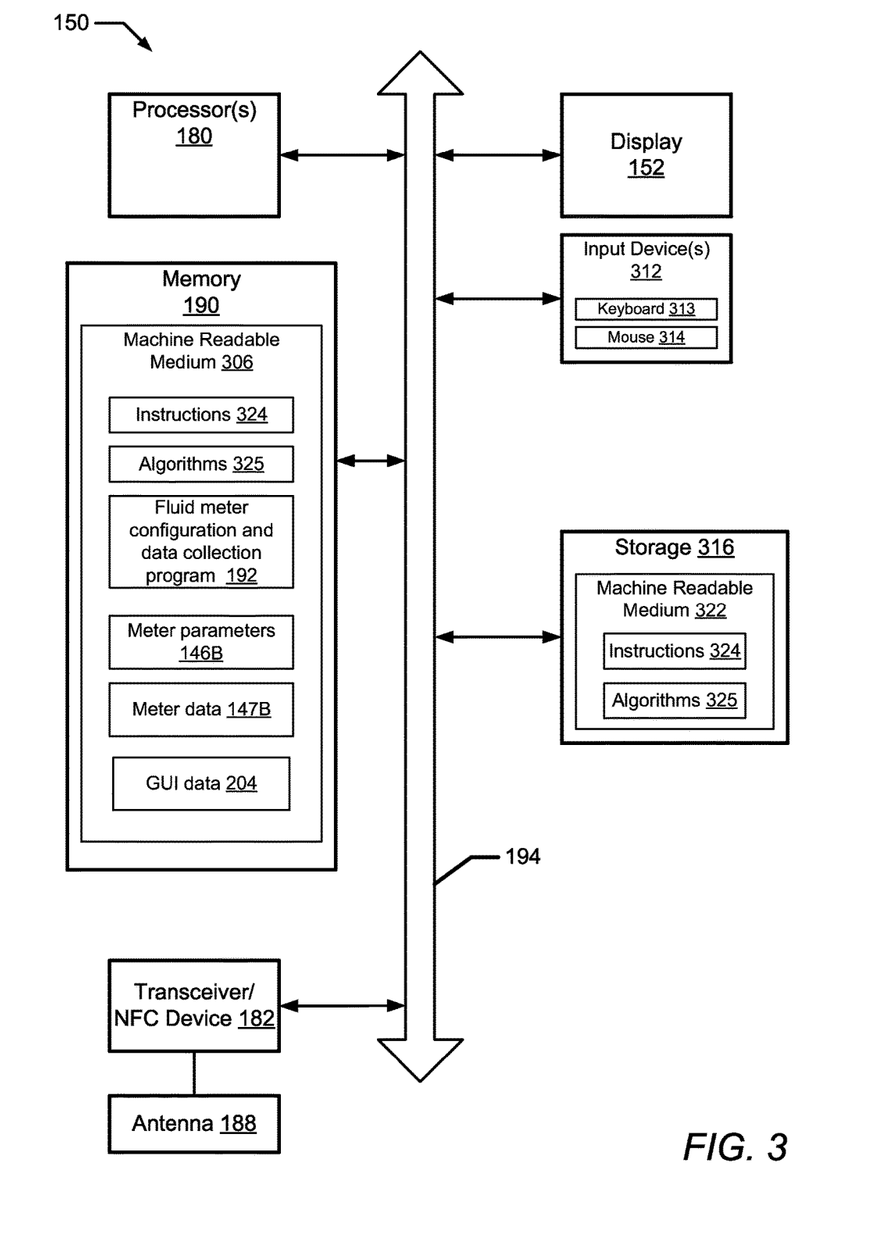
FIG. 3 is a block diagram of a mobile device, according to an example embodiment.

FIG. 3 illustrates an example block diagram of mobile device 150 within which a set of instructions 324 and/or algorithms 325 can be executed causing the mobile device 150 to perform any one or more of the methods, processes, operations, applications, or methodologies described herein.

Mobile device 150 includes one or more processors 180 such as a central processing unit (CPU) and a storage device such as memory 190, which communicate with each other via a system bus 194 which can represent a data bus and an address bus. Memory 190 includes a machine readable medium 306 on which is stored one or more sets of software such as instructions 324 and/or algorithms 325 embodying any one or more of the methodologies or functions described herein. Memory 190 can store instructions 324 and/or algorithms 325 for execution by processor 180. The mobile device 150 further includes a mobile display 152 such as a touch sensitive screen that is connected to system bus 194. The mobile device 150 also has input devices 312 such as an alphanumeric input device (e.g., keyboard 313) and a cursor control device (e.g., a mouse 314) that are connected to system bus 194.

A storage device 316, such as a hard drive or solid state drive, is connected to and in communication with the system bus 194. The storage device 316 includes a machine readable medium 322 on which is stored one or more sets of software such as instructions 324 and/or algorithms 325 embodying any one or more of the methodologies or functions described herein. The instructions 324 and/or algorithms 325 can also reside, completely or at least partially, within the memory 190 and/or within the processor 180 during execution thereof. The memory 190 and the processor 180 also contain machine readable media.

While the machine readable medium 322 is shown in an example embodiment to be a single medium, the term "machine readable medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the computer system and that cause the computer system to perform any one or more of the methodologies shown in the various embodiments of the present invention. The term "machine readable medium" shall accordingly be taken to include, but not be limited to, solid-state memories, optical and magnetic media, and carrier wave signals.

Mobile device 150 further includes a transceiver/NFC device 182 (which as used herein can include a separate transmitter and receiver) connected to system bus 194. Transceiver/NFC device 182 is connected to antenna 188. Transceiver/NFC device 182 can transmit and receive wireless signals 170 to and from meter 120. Transceiver/NFC device 182 can be a wide variety of communication devices such as radio frequency (RF) NFC, RFID, BLUETOOTH®, short-range 802.11, Wi-Fi, Zigbee, infrared and high frequency focused beams such as 60 GHz.

Machine readable medium 306 can store a fluid meter configuration and data collection (FMCDC) program 192 that can be implemented by processor 180. Machine readable medium 306 further stores parameters 146B for transmission to meter 120, meter data 147B received from meter 120 and GUI data 204.

In one embodiment, memory 190 stores a FMCDC program 192 implemented by the processor 180. FMCDC program 192 implements wirelessly transmitting a connection request to meter 120 via transceiver/NFC device 182. The meter 120 determines whether the connection request satisfies the stored security information 144. Provided the connection request satisfies the stored security information, the meter 120 transmits a wireless validation signal to mobile device 150. Responsive to receiving the wireless validation signal at mobile device 150, the mobile device wirelessly writes at least one parameter 146A on meter 120 or wirelessly reads stored meter data 147A from meter 120.

Figure 4:
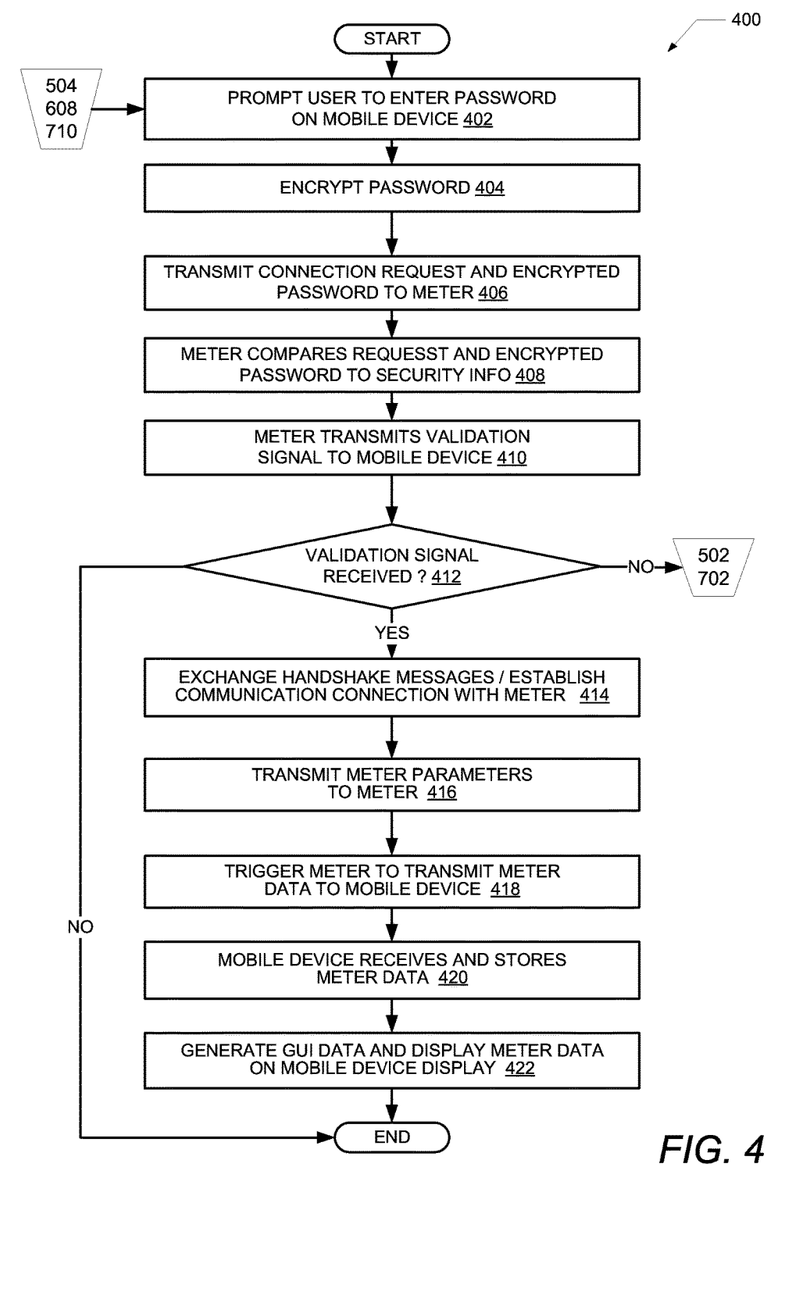
FIG. 4 is a flow chart that shows steps in an example method of meter configuring and data collection using a mobile device, according to an example embodiment.

FIG. 4 provides a flow chart showing steps in an example method 400 for meter configuring and data collection. Method 400 can be implemented via the execution of instructions 324 and/or algorithms 325 by processor 180 within mobile device 150 and specifically by the execution of FMCDC program 192 by processor 180. Method 400 begins at the start block and proceeds to block 402 where processor 180 prompts a user to enter a password on mobile device 150. The user can enter the password using a touch sensitive screen such as display 152 or using keyboard 313 or mouse 314. Processor 180 encrypts the password (block 404) and wirelessly transmits a connection request and the encrypted password to meter 120 via transceiver/NFC device 182 (block 406).

Processor 130 of meter 120 receives (via transceiver/NFC device 132) the connection request and password. Processor 130 determines if the connection request and password are valid by comparing the connecting request and password to security information 144 (block 408). If the connection request and password are valid, processor 130 responds by wirelessly transmitting a validation signal to mobile device 150 (via transceiver/NFC device 132) (block 410). If the connection request and password are not valid or if transceiver/NFC device 132 is in a sleep mode, processor 130 does not respond.

At decision block 412, processor 180 of mobile device 150 determines if the validation signal has been received from meter 120. In response to the validation signal not having been received from meter 120, processor 180 causes method 400 to proceed to block 502 of method 500 (FIG. 5) as described below. In response to the validation signal having been received from meter 120, processor 180 exchanges handshake messages with meter 120 (block 414) to establish a communication connection between mobile device 150 and meter 120 using a communication protocol.

Processor 180 wirelessly transmits or writes meter parameters 146B (via transceiver/NFC device 182) to meter 120 (block 416). Processor 180 triggers meter 120 to wirelessly transmit or read stored meter data 147A to mobile device 150 (block 418). Processor 180 receives the stored meter data 147A and stores the received meter data to memory 190 as meter data 147B (block 420). Processor 180 generates GUI data 204 based at least partially on meter parameters 146B and meter data 147B and displays the GUI data 204 on mobile display 152 (block 422). Method 400 then ends.

Figure 5:
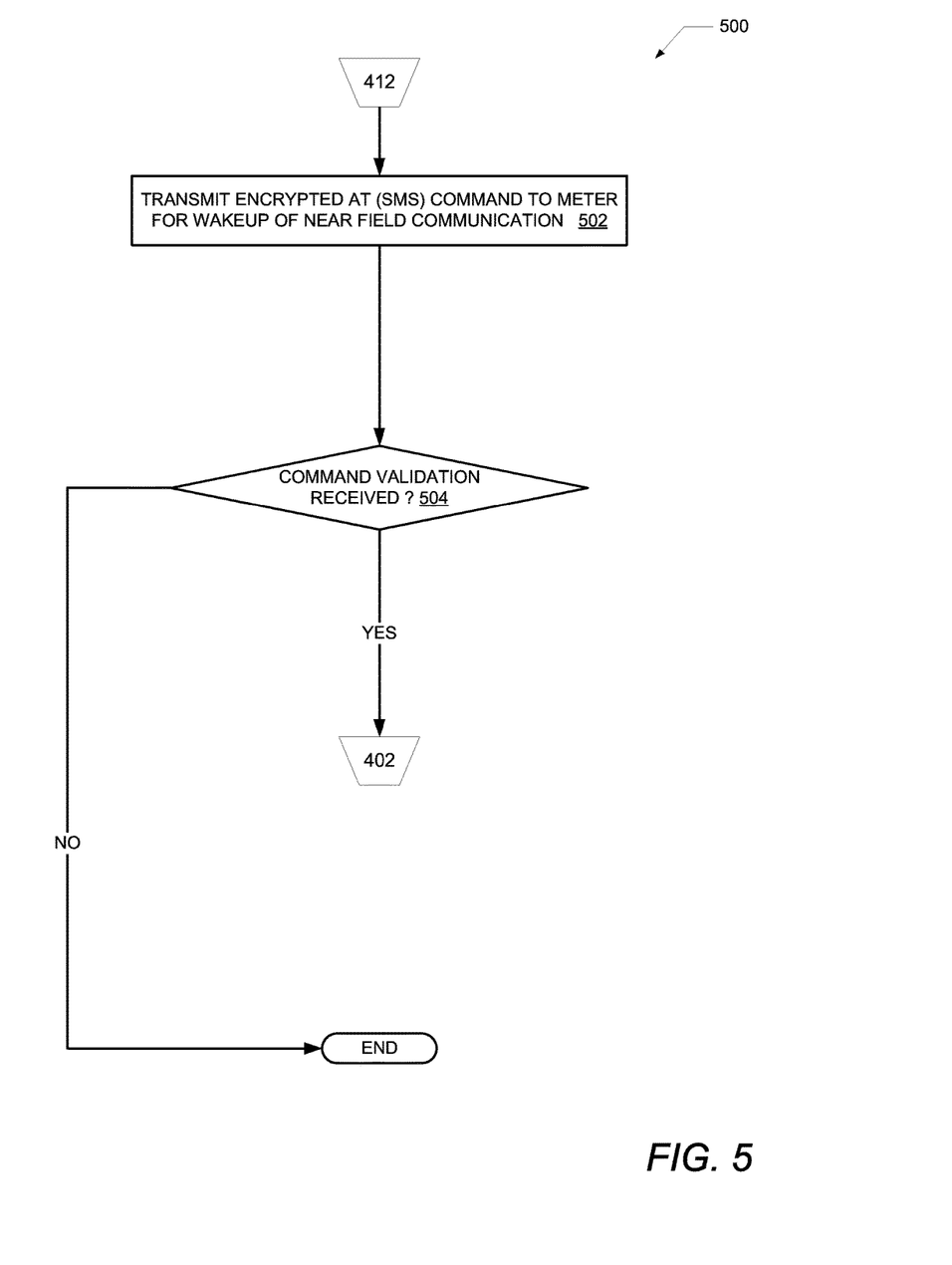
FIG. 5 is a flow chart that shows steps in an example method of activating a meter that is in a sleep mode, according to an example embodiment.

FIG. 5 is a flow chart showing steps in an example method 500 of activating a meter that is in a sleep mode using mobile device 150. Method 500 can be implemented via the execution of FMCDC program 192 by processor 180. Method 500 continues from block 412 and proceeds to block 502 where processor 180 of mobile device 150 transmits an encrypted AT or short message service (SMS) command to meter 120. The command causes transceiver/NFC device 132 of meter 120 to exit a sleep mode and wake up to a fully functional state.

At decision block 504, processor 180 determines if a validation signal of the command to wake up transceiver/NFC device 132 has been received from meter 120. In response to the validation signal not having been received from meter 120, method 500 ends. In response to the validation signal having been received from meter 120, processor 180 returns to block 402 of method 400 where the user is prompted to enter a password on mobile device 150.

Figure 6:
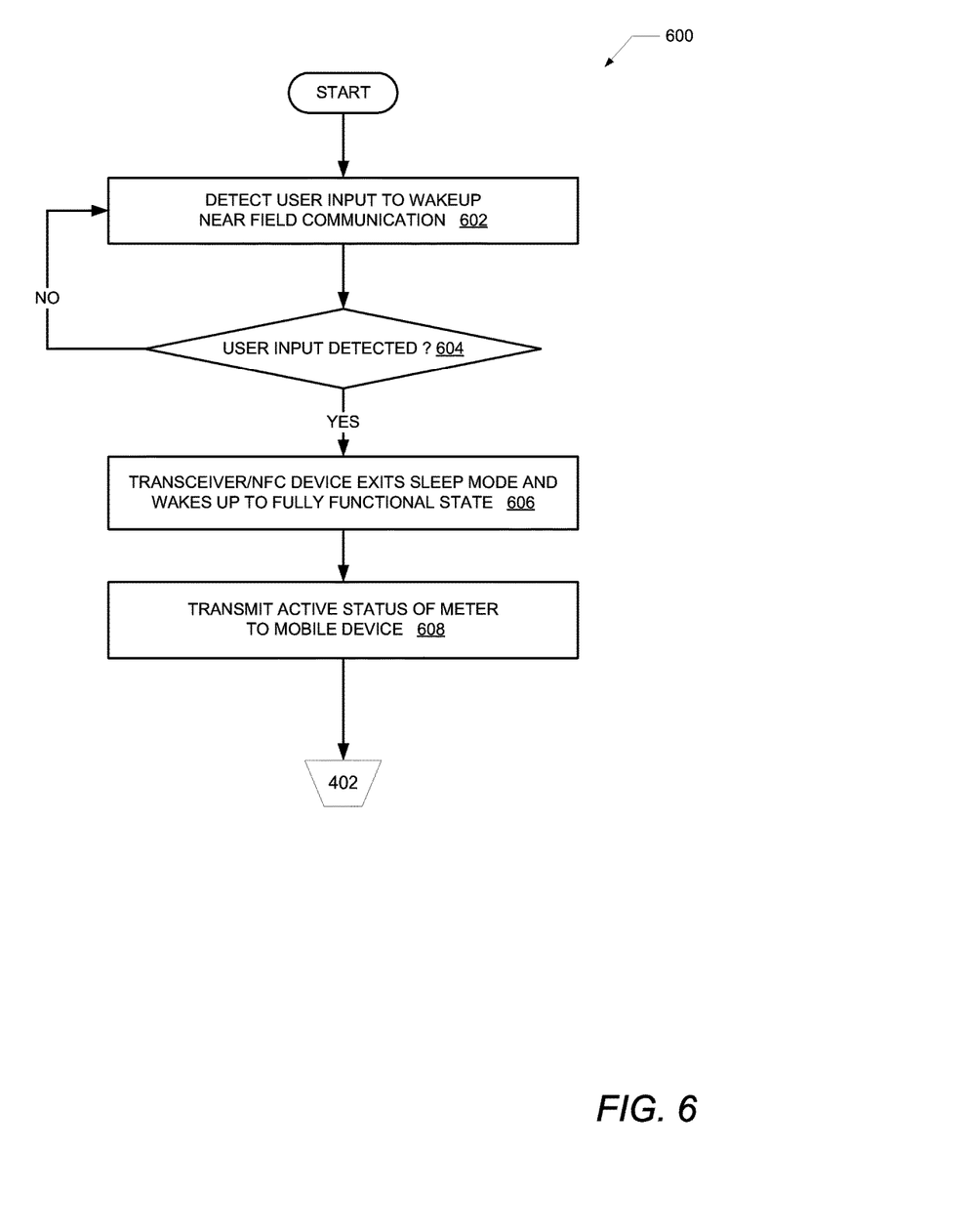
FIG. 6 is a flow chart that shows steps in another example method of activating a meter that is in a sleep mode, according to an example embodiment.

FIG. 6 is a flow chart showing steps in an example method 600 of activating a meter 120 that is in a sleep mode. Method 600 can be implemented via the execution of meter communication program 142 by processor 130. Method 600 begins at the start block and proceeds to block 602 where processor 130 detects user input to meter 120 from either mobile device 150 or from enable control 138 in order to activate or wakeup meter 120 from a sleep mode. In one embodiment, a user can provide input to wake up meter 120 using enable control 138 such as buttons, rotary switches, touch pads or touch sensitive screens.

At decision block 604, processor 130 determines if user input to wakeup the meter 120 from a sleep mode has been detected. In response to no user input to wakeup the meter from a sleep mode being detected, method 600 returns to block 602 to continue detecting user input. In response to user input to wakeup the meter from a sleep mode being detected, processor 130 triggers transceiver/NFC device 132 to exit the sleep mode and be activated to a fully functional state (block 606). Processor 130 transmits a signal via transceiver/NFC device 132 to mobile device that meter 120 is active (block 608). Method 600 then returns to block 402 of method 400 where the user is prompted to enter a password on mobile device 150.

Figure 7:
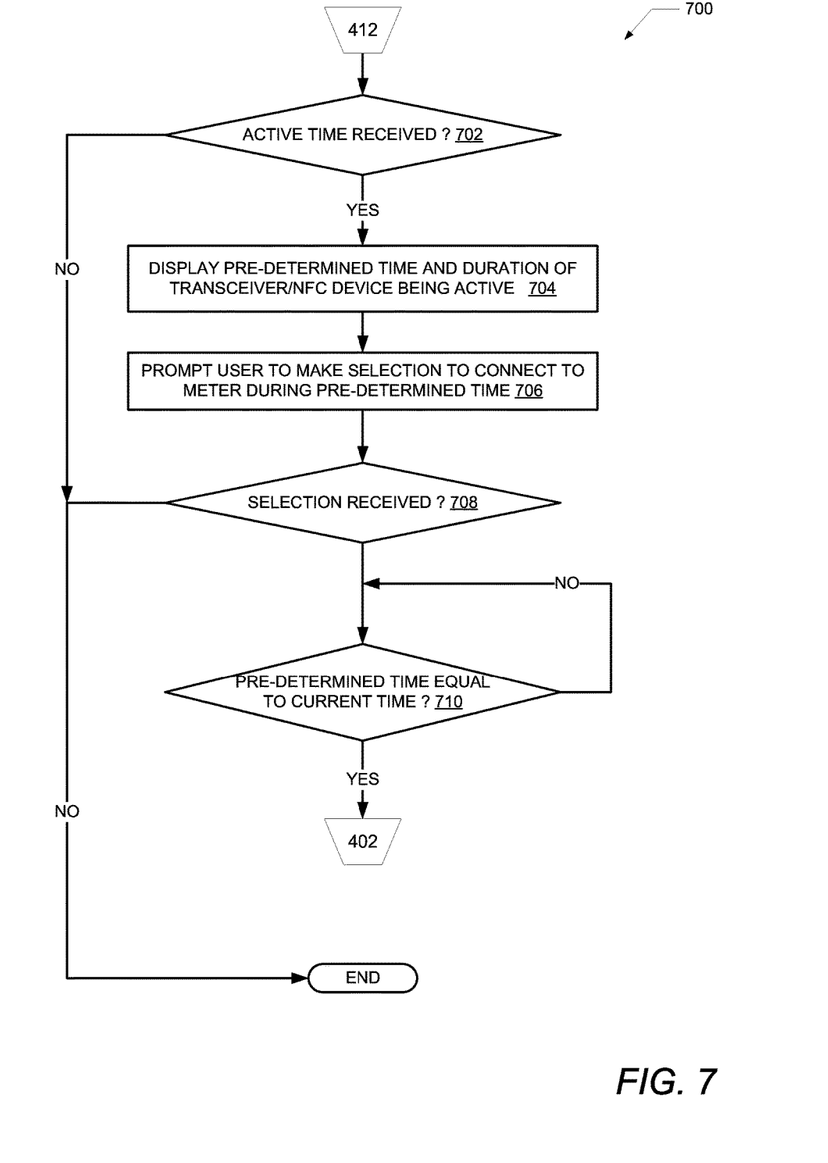
FIG. 7 is a flow chart that shows steps in an additional example method of connecting to a meter that is active during a pre-determined time period, according to an example embodiment.

FIG. 7 is a flow chart showing steps in an example method 700 of connecting to a meter that is active during a pre-determined time period. Method 700 can be implemented via the execution of FMCDC program 192 by processor 180. Method 700 continues from block 412 and proceeds to decision block 702 where processor 180 of mobile device 150 determines if a communication of an active time for transceiver/NFC device 132 has been received from meter 120. In response to no communication of an active time for transceiver/NFC device 132 being received, method 700 ends. In response to communication of an active time for transceiver/NFC device 132 being received, processor 180 displays a pre-determined time and duration of transceiver/NFC device 132 being active on mobile display 152 (block 704).

Processor 180 prompts a user to make a selection using a touch sensitive screen of display 152 whether mobile device 150 is to connect to meter 120 during the pre-determined time (block 706). At decision block 708, processor 180 determines if user input has been received. In response to no user input of a selection being received, method 700 ends. In response to the user selecting to connect to meter 120 during the pre-determined time, processor 180 determines if the pre-determined time is equal to the current time (decision block 710). In response to the pre-determined time not being equal to the current time, processor 180 continues to determine if the pre-determined time is equal to the current time at decision block 710. In response to the pre-determined time being equal to the current time, processor 180 returns to block 402 of method 400 where the user is prompted to enter a password on mobile device 150.

In summary, disclosed embodiments provide new methods for interfacing with battery powered fluid meters that significantly limit the battery power consumption. The meters in the near-field by can be located by auto discovery. Secured and authenticated access to the meters is provided as well as on-demand wireless communication interface availability to connect. The meters can receive a software upgrade over the air. The mobile device 150 can act as secondary data storage that enables check pointing of data. Mobile device 150 can save received meter data 147A to memory 190 or storage 316 before a meter software update. This enables auditing of the meter 120 and also allows restoration of the meter's software in case of a problem (software reset to previous software version).

Benefits for the end user of disclosed wireless devices include an improved user experience while performing configuration and operations, and a secured method to access and configure meters. Moreover, rapid identification of physical location of the meters and reduced effort to connect and establish communication with the meters are also provided.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method, comprising:
providing a mobile device including a mobile display and a first transceiver comprising a near field communications device coupled to an antenna configured for sending wireless signals to and receiving wireless signals from fluid meter including a second transceiver comprising a near field communications device that includes a sleep mode that is exclusively battery powered having a fluid flow sensor and stored security information, said mobile device further including a memory device and at least one processor coupled to said first transceiver and said memory device, wherein said memory device stores a fluid meter configuration and data collection (FMCDC) program implemented by said processor;
said mobile device wirelessly transmitting a connection request to said fluid meter;
said fluid meter determining whether said connection request satisfies said stored security information, wherein said determining whether said connection request satisfies said stored security information is performed exclusively by said fluid meter;
provided said connection request satisfies said stored security information, said fluid meter transmitting a wireless validation signal, and
responsive to receiving said wireless validation signal at said mobile device, said mobile device wirelessly writing at least one parameter on said fluid meter or wirelessly reading stored meter data from said fluid meter.

2. The method of claim 1, wherein said stored security information includes a mobile number or a hardware address of said mobile device enabling an identity of said mobile device to be determined for checking by said fluid meter to a stored list of authorized ones of said mobile devices that can access said fluid meter.

3. The method of claim 1, wherein said stored security information includes at least one stored security password and said connection request includes a password portion.

4. The method of claim 1, wherein said near field communication device of said mobile device and fluid meter both implement a communication protocol selected from radio frequency (RF) NFC, RFID, BLUETOOTH®, short-range 802.11, Wi-Fi, Zigbee, and infrared.

5. The method of claim 1, further comprising:
determining if said near field communication device of said fluid meter is active; and responsive to said near field communication device of said fluid meter being active, prompting a user to enter a password on said mobile device.

6. The method of claim 5, further comprising:
responsive to said near field communication device of said fluid meter being in said sleep mode, transmitting an encrypted short message service (SMS) command to said fluid meter to activate said near field communication device.

7. The method of claim 5, further comprising:
responsive to said near field communication device of said fluid meter being in said sleep mode, detecting a user input to said fluid meter to activate said near field communication device;
determining if said user input has been received; and responsive to receiving said user input, activating said near field communication device.

8. The method of claim 5, further comprising:
responsive to said near field communication device of said fluid meter being in said sleep mode, displaying a pre-determined time of the near field communication device being active;
determining if a user input to connect said mobile device to said fluid meter during said pre-determined time has been received;
responsive to receiving said user input to connect said mobile device to said fluid meter during said pre-determined time, determining if said pre-determined time is equal to a current time; and
responsive to said pre-determined time being equal to said current time, transmitting said connection request and said password to said fluid meter.

9. The method of claim 1, wherein said fluid meter is one of a gas meter, a water meter or a sewage meter.

10. A mobile device comprising:
a first transceiver comprising a near field communications device coupled to an antenna configured to send wireless signals to and receive wireless signals from a fluid meter including a second transceiver comprising a near field communications device that includes a sleep mode that is exclusively battery powered having a fluidflow sensor and stored security information;
a mobile display;
a memory device;
at least one processor coupled to said first transceiver, said mobile display and said memory device, wherein said memory device stores a fluid meter configuration and datacollection (FMCDC) program implemented by said processor;
said mobile device wirelessly transmitting a connection request to said fluid meter;
said fluid meter determining whether said connection request satisfies said stored security information, wherein said determining whether said connection request satisfies said stored security information is performed exclusively by said fluid meter;

provided said connection request satisfies said stored security information, said fluid meter transmitting a wireless validation signal, and responsive to receiving said wireless validation signal at said mobile device, said mobile device wirelessly writing at least one parameter on said fluid meter or wirelessly reading stored meter data from said fluid meter.

11. The mobile device of claim 10, wherein said stored security information includes a mobile number or a hardware address of said mobile device enabling an identity of said mobile device to be determined for checking by said fluid meter to a stored list of authorized ones of said mobile devices that can access said fluid meter.

12. The mobile device of claim 10, wherein said stored security information includes at least one stored security password and said connection request includes a password portion.

13. The mobile device of claim 10, wherein said near field communication device implements a communication protocol selected from radio frequency (RF) NFC, RFID, BLUETOOTH®, short-range 802.11, Wi-Fi, Zigbee, and infrared.

14. The mobile device of claim 10, further comprising:
determining if a near field communication device of said fluid meter is active; and
responsive to said near field communication device of said fluid meter being active, prompting a user to enter a password on said mobile device.

15. The mobile device of claim 14, further comprising:
responsive to said near field communication device of said fluid meter being in said sleep mode, transmitting an encrypted short message service (SMS) command to said fluid meter to activate said near field communication device of said fluid meter.

16. The mobile device of claim 14, further comprising:
responsive to said near field communication device of said fluid meter being in said sleep mode, detecting a user input to said fluid meter to activate said near field communication device of said fluid meter; determining if said user input has been received; and
responsive to receiving said user input, activating said near field communication device of said fluid meter.

17. The mobile device of claim 14, further comprising:
responsive to said near field communication device of said fluid meter being in said sleep mode, displaying a pre-determined time of the near field communication device of said fluid meter being active;
determining if a user input to connect said mobile device to said fluid meter during said pre-determined time has been received;
responsive to receiving said user input to connect said mobile device to said fluid meter during said pre-determined time, determining if said pre-determined time is equal to a current time; and
responsive to said pre-determined time being equal to said current time,
transmitting said connection request and said password to said fluid meter.

18. The mobile device of claim 10, wherein said fluid meter is one of a gas meter, a water meter or a sewage meter.

* * * * *